United States Patent
Goodbread et al.

(10) Patent No.: US 12,265,006 B2
(45) Date of Patent: Apr. 1, 2025

(54) FLUID PROPERTY SENSORS HAVING SUPERIMPOSED VIBRATIONS

(71) Applicant: Rheonics GmbH, Winterthur (CH)

(72) Inventors: Joe Goodbread, Winterthur (CH); Daniel Brunner, Illnau (CH); Sunil Kumar, Winterthur (CH)

(73) Assignee: Rheonics GmbH, Winterthur (CH)

( * ) Notice: Subject to any disclaimer, the term of this patent is extended or adjusted under 35 U.S.C. 154(b) by 0 days.

(21) Appl. No.: 18/770,250

(22) Filed: Jul. 11, 2024

(65) Prior Publication Data

US 2025/0052657 A1   Feb. 13, 2025

Related U.S. Application Data

(60) Provisional application No. 63/518,450, filed on Aug. 9, 2023.

(51) Int. Cl.
*G01N 11/16* (2006.01)

(52) U.S. Cl.
CPC .................. *G01N 11/162* (2013.01)

(58) Field of Classification Search
CPC ..... G01N 11/162; G01N 11/165; G01N 11/16
USPC .... 73/19.03, 24.01–24.5, 30.01, 30.04, 31.5, 73/32 A, 54.01, 54.24–54.35, 54.41, 73/64.53, 702; 374/117–119
See application file for complete search history.

(56) References Cited

U.S. PATENT DOCUMENTS

| | | | |
|---|---|---|---|
| 3,062,040 A | 11/1962 | McKennell et al. | |
| 5,323,638 A * | 6/1994 | Langdon | G01N 11/16 73/54.27 |
| 7,681,449 B2 | 3/2010 | Wolf et al. | |
| 8,291,750 B1 | 10/2012 | Goodbread et al. | |
| 8,607,619 B2 * | 12/2013 | Djakov | G01F 1/684 73/54.24 |
| 8,752,416 B2 | 6/2014 | Goodbread et al. | |
| 9,267,872 B2 | 2/2016 | Haeusler et al. | |
| 9,518,906 B2 | 12/2016 | Goodbread et al. | |
| 9,995,666 B2 | 6/2018 | Goodbread | |
| 9,995,715 B2 | 6/2018 | Goodbread | |
| 10,184,881 B2 | 1/2019 | Goodbread et al. | |
| 10,502,670 B2 | 12/2019 | Goodbread et al. | |
| 10,871,432 B1 | 12/2020 | Haeusler et al. | |
| 11,125,668 B2 | 9/2021 | Goodbread et al. | |
| 11,391,657 B2 | 7/2022 | Haeusler et al. | |
| 11,781,961 B1 | 10/2023 | Goodbread et al. | |
| 2014/0331766 A1 * | 11/2014 | Kramer | G01N 11/16 73/579 |

(Continued)

FOREIGN PATENT DOCUMENTS

CN   115629009 A   1/2023

Primary Examiner — Robert R Raevis
(74) Attorney, Agent, or Firm — Kolitch Romano Dascenzo Gates LLC (57) ABSTRACT

Fluid property sensors described herein may include a resonator configured to be immersed in a fluid or flowable medium and a vibrator coupled to the resonator, such that vibrations of the vibrator are transmitted to the resonator, e.g., to discourage and/or remove any buildup or deposits on the resonator and/or increase accuracy of the sensors. The frequency of the vibrator is configured to be substantially lower than the frequency of the resonator, such that operation of the resonator is not negatively affected. The vibrator may be located internal to, or external to, a chassis of the device.

20 Claims, 5 Drawing Sheets

(56) References Cited

U.S. PATENT DOCUMENTS

2022/0136946 A1* 5/2022 Macdonald ............ G01N 9/002
 73/32 A
2023/0236103 A1* 7/2023 Macdonald ............ G01N 11/16
 73/32 A

* cited by examiner

FLUID PROPERTY SENSORS HAVING SUPERIMPOSED VIBRATIONS

CROSS-REFERENCES

The following applications and materials are incorporated herein, in their entireties, for all purposes: U.S. Provisional Patent Application Ser. No. 63/518,450, filed Aug. 9, 2023

FIELD

This disclosure relates to systems and methods for fluid property sensors.

BACKGROUND

Vibrational fluid property sensors often suffer from distortion of their readings when the fluids with which they are in contact form adherent films or solid deposits on their surfaces. Various methods are known for attempting to prevent or remove these deposits in situ, the most common of which is to coat the fluid-facing surfaces of the sensor with a low surface energy coating such as PTFE. Such coatings tend to erode with time, especially in the presence of abrasive material suspended in the fluid in which they are in contact.

It is also known that adherent deposits are more likely to form on fluid-facing surfaces of fluid property sensors when the surfaces are immersed in static, rather than flowing or stirred fluids, or in areas where the flow stagnates, thus producing quasi-static flow fields even when the bulk fluid is flowing past the sensor.

It is known in prior art that it is possible to reduce the deposition of material on such vibrational fluid property sensors by causing the surfaces of such sensors to vibrate in such a way as to guarantee that there is always a substantial motion of fluid in intimate contact with the surface of these sensors, so as to create large velocity gradients in the immediate vicinity of the surfaces with the goal of discouraging the deposition of, or removing the deposited material. A typical method for reducing or removing these deposits relies on the excitation of ultrasonic vibrations in the sensors, which ultrasonic vibrations tend, in light of their high frequencies (upwards of 20 kHz) to produce high shear rates in the fluid in intimate contact with the sensor surfaces so excited.

Additionally, measuring and analyzing the rheological properties of complex, non-Newtonian fluids, such as structured fluids often require a detailed rheological investigation involving one or more delicate and precise laboratory instruments, as well as trained laboratory technicians, making the rheological investigations impractical as an online consistency control method. Accordingly, improvements in fluid property sensors enabling consistent measurements of complex fluids would be beneficial.

SUMMARY

The present disclosure provides systems, apparatuses, and methods relating to improved fluid property sensors, which may include sensors configured to measure one or more properties of flowable media, such as liquids, gases, powders, granular materials, suspensions, gels, and/or the like. In the present disclosure, the term "fluid(s)" may be used interchangeably with the term "flowable medium" or "flowable media," as the case may be.

Fluid property sensors of the present disclosure may include a resonant fluid property sensor coupled to a sensor chassis, wherein the resonant fluid property sensor is configured to operate at a first frequency; a support structure coupled to the sensor chassis, wherein the support structure is configured to support the sensor chassis when the resonant fluid property sensor is immersed in a fluid or flowable medium; and a vibrator coupled to the sensor chassis, wherein the vibrator is configured to vibrate at a second frequency and transmit vibrations through the chassis to the resonant fluid property sensor.

Methods of measuring one or more fluid properties of the present disclosure may include submerging a resonant fluid property sensor into a fluid or flowable medium; measuring one or more properties of the fluid or flowable medium using the resonant fluid property sensor, wherein the fluid property sensor is configured to operate at a resonant frequency; and transmitting vibrations to the resonant fluid property sensor at a second frequency lower than the resonant frequency.

Sensors of the present disclosure provide several benefits and advantages over known solutions for measuring fluid properties. For example, embodiments and examples described herein may have one or more of the following advantages:

- allow for reliable, repeatable, and stable online measurements of process-relevant fluid behavior in the presence of highly non-Newtonian behavior under variable flow regimes, as well as in fluids that tend to produce deposits on the sensors.
- allow a self-cleaning mechanism that prevents buildup on the sensor, thereby preserving its resonance characteristics and maintaining calibration without the need for recalibration after exposure to fluids.
- ensure that superimposed vibrations do not interfere with the sensor's primary role of providing accurate and reproducible fluid measurements by controlling the amplitude and frequency of the superimposed vibrations to prevent large stresses in the sensor's resonant structures and to avoid saturating or distorting the signal from the resonator.
- allow for quick recovery of the sensor following the cleaning phase, enabling accurate measurements before further deposition occurs.

These and other features, functions, and advantages may be achieved independently in various embodiments of the present disclosure, or may be combined in yet other embodiments, further details of which can be seen with reference to the following description and drawings.

DETAILED DESCRIPTION

Various aspects and examples of an improved fluid property sensor, as well as related methods, are described below and illustrated in the associated drawings. Unless otherwise specified, a sensor in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, resonant fluid property sensors take advantage of vibrations induced in a resonator element. Resonant properties of the resonator are modified by the fluid being measured, such that one or more properties of the fluid (e.g., viscosity) can be determined. As the sensor is in contact with the fluid, physical buildup of material can occur on the sensor, leading to measurement errors. Sensors of the present disclosure include one or more self-cleaning features configured to discourage and remove adherent material deposited from the fluid. For example, additional vibrational excitation may be applied to the sensor, e.g., via superimposed vibrations, to clean the sensor and prevent buildup. To maintain proper functionality, such additional vibrational excitations are incorporated under the following conditions:

Superimposed vibrations do not damage or otherwise negatively affect the sensor, preserving its resonance characteristics and maintaining calibration without the need for recalibration after exposure to cleaning vibrations.

Superimposed vibrations do not interfere with the sensor's primary role of providing accurate and reproducible fluid measurements. This may be achieved, e.g., by either ensuring the superimposed vibrations do not affect the measurements during operation or by alternating the superimposed vibrations with the sensor's operation periods.

To avoid damage and negative effects, the amplitude and frequency of the superimposed vibrations are controlled to prevent large stresses in the sensor's resonant structures. These stresses, if present, could excite resonant modes, leading to plastic deformation or failure due to fatigue. Thus, the systems and methods of the present disclosure ensure superimposed vibrations remain outside the bandwidth of any vibrational modes of the resonant structures or, if within the bandwidth, are kept at sufficiently low amplitudes to avoid damage or permanent material effects.

To avoid interaction with the transducer mechanisms in a way that would alter sensor readings, the coupling between superimposed vibrations and the sensor's resonant mechanism, including the electronics used for excitation and measurement, is designed to avoid saturating or distorting the signal returned to the sensor's electronics. This ensures that the frequency of the superimposed vibrations remains outside the measurement bandwidth of the resonant system, or if within it, the motion amplitude remains low enough to prevent nonlinear signal superposition.

In examples where the sensing and cleaning operations alternate, systems and methods of the present disclosure ensure that during the sensing phase the measurement system recovers from its inactive state promptly following the cleaning phase. This quick recovery allows for accurate measurements before any deposition occurs that could distort the readings.

In general, the manufacturing and application of fluid products are greatly affected by the consistency of the fluid products. Many fluids possess complex rheological properties, which in composite, contribute to the fluids' consistency, e.g., the subjective and objective behavior of the fluids in their stored and applied forms. For example, the consistency/fluid properties of a sauce such as tomato ketchup may determine how the sauce will flow from its container. For example, ketchup may be expected to flow easily from a bottle during application, while having different behavior when stationary, such that it does not flow quickly off of a food item onto which it has been deposited.

In such examples, the sauce is expected to behave in the first instance as a pourable fluid, and in the second instance as a structured fluid with a non-zero yield stress, allowing it to keep its form without flowing under gravitational forces. Because of this complex behavior, a full characterization of fluids such as tomato ketchup may require a detailed rheological investigation involving one or more delicate and precise laboratory apparatuses, as well as, e.g., trained laboratory technicians, making the rheological investigations impractical as an online consistency control method.

Similar considerations apply to other non-Newtonian fluids, such as ceramic slurries used for forming shells for investment casting and printing inks used in high-speed flexographic and gravure printing processes. Further included in this category are battery electrode slurries, sealants, adhesives, food products, and numerous other products, all of which are expected to perform in predictable ways under flow conditions found in industrial and/or personal applications.

When such fluids are produced or applied in industrial processes, maintenance of consistent flow behavior is of primary importance. Despite the complex flow behavior of, for instance, investment casting slurries, single point measurements of apparent viscosity using efflux cups (Zahn cups or similar devices) remains a standard method. Such measurements are performed by hand, sporadically, and with generally low measurement precision and repeatability. Production of high-quality casting shells requires tight control over consistency of the slurries, which can only be roughly approximated by efflux cup measurements.

In general, vibrational fluid property sensors function by immersing a resonant element in a fluid and measuring the effect of the fluid on the resonant behavior of the resonator, e.g., the resonant element's resonance frequency and damping. The sensing devices typically provide single-point values of the fluid's viscosity and/or density, as well as temperature. However, because of the periodic oscillation of the resonator, the shearing behavior of the fluid in contact with the resonator is not strictly determined. Hence, the fluid properties measurements provided by the sensors are at best an average over a range of shear rates and therefore are not an accurately determined, rheologically precise measurement. Instead, these measurements reflect the "consistency" of the fluid.

Furthermore, the sensors are expected to measure the fluid consistency under a variety of flow regimes. The fluid may be stationary, e.g., in a storage tank, agitated, e.g., in a mixing vessel, or under steady and/or pulsating flow, e.g., in a connecting pipe conducting the fluid between locations in a complex process. Fluids that possess a yield stress behave as solids in their stationary state and as liquids when the shear stresses on the fluids exceed the yield stress. The yield stress typically relates to temporary structures formed within the stationary fluid, such as gels, that are temporarily or permanently destroyed or modified when subject to shearing forces that exceed the yield stress. In that case, the fluid behaves differently when stationary, when being agitated in a mixer, and/or when flowing through a pipe. Online sensors typically produce different measurement values for the same fluid when inserted in points in the process that expose the fluids to differing flow regimes.

A further challenge to making useful one-point online measurements of fluid properties is the tendency of many fluids to deposit solid or semi-solid materials onto the resonant sensors. Such deposits typically alter the measurement values delivered by the sensor, and so cause the measurements to diverge from the values that reflect the behavior of the bulk fluid from which the materials were deposited. The deposits can cause drift, level shifts, or even malfunction of the sensors.

Systems and methods of the present disclosure provide reliable, repeatable, and stable online measurements of process-relevant fluid behavior in the presence of highly non-Newtonian behavior under variable flow regimes, as well as in fluids that tend to produce deposits on the sensors.

Systems and methods of the present disclosure related to resonant fluid property sensors having one or more of the following features:

- A resonant sensing element including a fluid-impermeable housing containing a transducer.
- A device configured to superimpose vibrations of appropriate amplitude and frequency on the resonant sensing element to produce a periodic large-amplitude motion on the resonant sensing element. In some examples, the vibrator and the resonator are the same structure but are driven at different frequencies and/or amplitudes.
- Superimposing sufficiently large amplitude vibrations to clean the sensing element of deposited material that would otherwise interfere with its sensing function.
- Use of a balanced torsional resonator, such as those described in U.S. Pat. No. 9,267,872, as the sensing element, which is less susceptible to external vibrations and requires less massive mounting structures.
- The self-cleaning function of the sensor system is configured to operate such that it does not damage the sensor or affect its calibration and measurements.
- The resonant sensor is affixed to one end of a rigid tube, which acts as a structure for transmitting cleaning vibrations to the sensor.
- The vibration-producing mechanism is disposed within the rigid tube, causing the entire structure to vibrate and clean the sensor.
- The cleaning vibrations are of a lower frequency than the resonant sensor's measurement modes, which prevents damage due to fatigue and does not interfere with the sensor's measurements. This wide separation in frequency between the effective cleaning vibrations and the modal frequencies of the balanced torsional resonators simplifies the electronic processing of signals Aspects of the sensor (e.g., a controller of the sensor system) may be embodied as a computer method, computer system, or computer program product. Accordingly, aspects of the sensor may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the sensor may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the sensor may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the sensor may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally, or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the sensor. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative fluid property sensors as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Fluid Property Sensor

Figure 1:
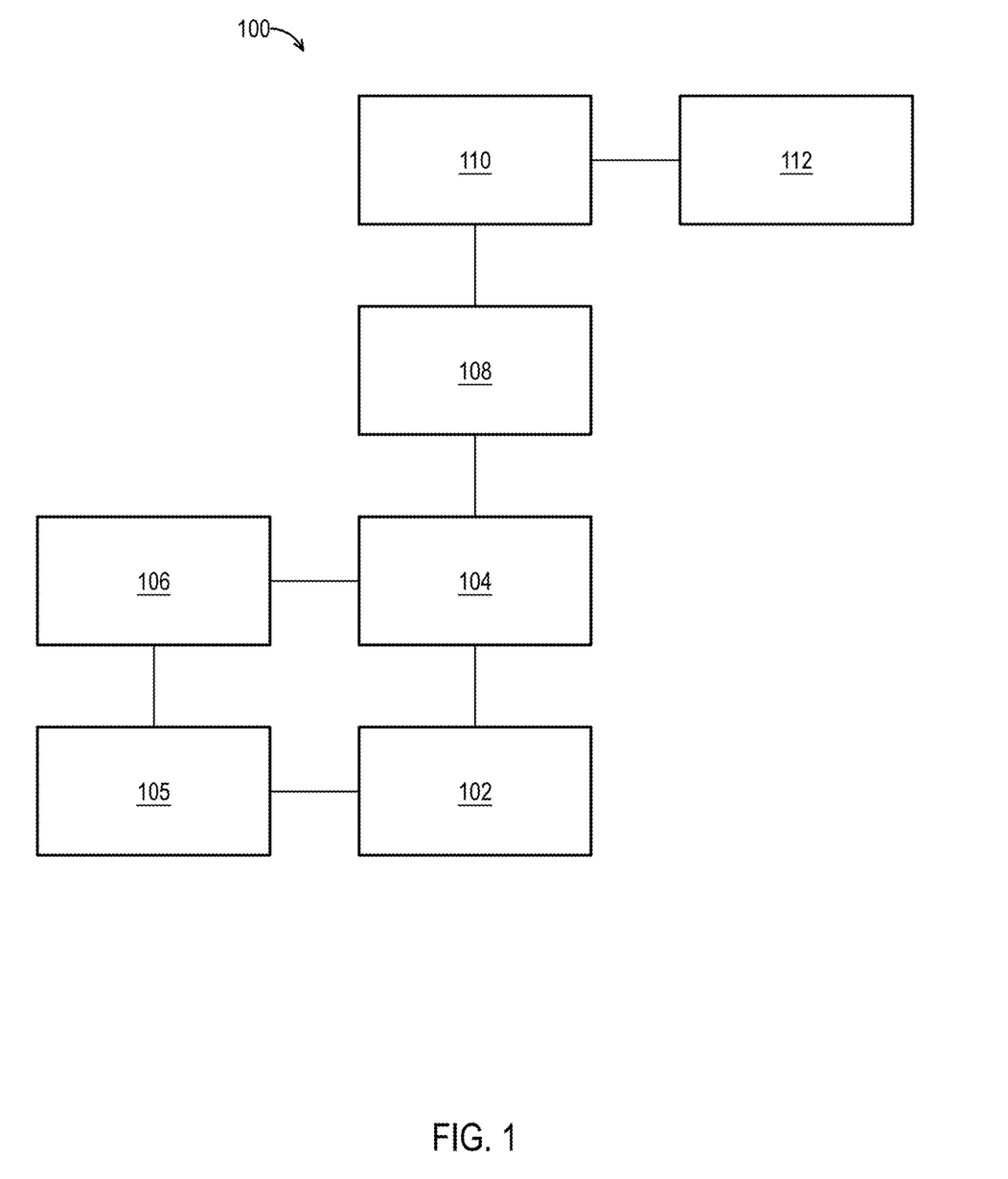
FIG. 1 is a schematic diagram of an illustrative fluid property sensor in accordance with aspects of the present disclosure.

As shown in the schematic diagram of FIG. 1, this section describes an illustrative fluid property sensor 100. Sensor 100 is an example of the fluid property sensors described above.

Sensor 100 includes a resonant fluid property sensor 102 (AKA a resonator) coupled, e.g., via a coupling rod, to a chassis 104 of sensor 100. In some examples, resonator 102 operates in the frequency range of 2,000-10,000 Hz [or more]. Resonator 102 is configured to be submerged within a fluid under test during operation of the sensor. In some examples resonator 102 is a torsional resonator, e.g., resonator 102 may oscillate torsionally. More specifically, a torsional resonator is a type of mechanical resonator that operates based on torsional (twisting) resonance, and may be configured to oscillate with high sensitivity to applied torque.

In some examples, resonator 102 is a balanced torsional resonator configured to vibrate symmetrically around a nodal point. Balanced torsional resonators have a high degree of isolation from, and insensitivity to, mounting conditions and thus are not affected by superimposed vibrations that are substantially far from their resonant modes. In other words, balanced torsional resonators provide a low coupling to their support structure, thereby providing isolation from any superimposed cleaning vibrations. Accordingly, in such examples, resonator 102 additionally functions as a mechanical wave filter, blocking influence from outside vibrations.

In some examples, resonator 102 operates similar to a damped mass-spring system, e.g., in which damping is applied by the fluid under test. Input energy (e.g., torque) is converted into oscillations or vibrations within the resonator at a resonant frequency. Oscillation of the resonator is dampened by the surrounding fluid, and the level of dampening can be converted into fluid properties (e.g., viscosity). In other words, by measuring an effect on the resonant properties of resonator 102 by the fluid under test, one or more rheological properties of the fluid may be determined (e.g., density, viscosity, etc.). For example, the resonator's natural frequency modes may be altered by the fluid. The frequency in which resonator 102 is configured to oscillate may depend on the material composition of the fluid under test, as well as the fluid properties in which sensor 100 is measuring.

In some examples, resonator 102 is controlled by an electronic controller 105. Electronic controller 105 may be configured to provide resonator 102 with a control voltage suitable for controlling the resonator. The control voltage provided by electronic controller 105 may comprise any suitable signal. For example, controller 105 may control one or more of a frequency, amplitude, phase, mode, duty cycle, and/or other operating characteristic of resonator 102.

Electronic controller 105 may additionally be used for receiving or retrieving sensor data from resonator 102, e.g., sensor data relating to one or more measured fluid properties. In some examples, electronic controller 105 is configured to apply one or more signal analysis and/or signal processing functions to sensor data retrieved from resonator 102. Additionally, or alternatively, electronic controller 105 may be in communication with one or more data processing systems configured to process sensor data from resonator 102. Accordingly, electronic controller 105 may be configured to retrieve sensor data from resonator 102 and communicate the sensor data to the one or more data processing systems.

As described above, exposure to the fluid may lead to deposits or buildup on a surface of the resonator, thereby affecting its accuracy. Accordingly, sensor 100 incorporates or is coupled to a vibrator 106 configured to produce superimposed vibrations along the sensor, e.g., to discourage deposits/buildup on the resonator. In some examples, such as in sensor 200, described below with respect to FIG. 3, vibrator 106 is external to chassis 104, e.g., coupled to chassis 104 by one or more mounting structures and/or fasteners. In such examples, vibrator 106 may be shielded from fluid ingress via a protective housing. In some examples, such as in sensor 300, described below with respect to FIG. 4, vibrator 106 is internally located within chassis 104.

Vibrator 106 may be controlled by electronic controller 105, e.g., electronic controller 105 may be configured to provide vibrator 106 with a control voltage suitable for controlling the vibrator. For example, controller 105 may control one or more of a frequency, amplitude, phase, mode, duty cycle, and/or other operating characteristic of vibrator 106.

Vibrator 106 may comprise a linear vibrator, such that the superimposed vibrations imparted on resonator 102 by vibrator 106 are linear vibrations, e.g., along a long axis of the sensor. For example, vibrator 106 may be a pneumatically actuated linear vibrator.

In some examples, vibrator 106 comprises one or more motors configured to rotate an unbalanced, eccentric mass such that the vibrational forces are perpendicular to the motor shaft(s). In some examples, vibrator 106 comprises a solenoid coil with a magnetic core configured to be driven by an alternating current to provide a linear vibration. In some examples, vibrator 106 is a pneumatically actuated rotary vibrator configured to utilize a tangential air jet to drive a ball in a circular race, thereby producing a vibrational force, the direction and magnitude of the force being dependent on the mechanical structure between the race and the structure to which is it attached.

To maintain proper and accurate functionality of sensor 100, vibrator 106 is configured to operate under the following conditions: the superimposed vibrations do not damage or otherwise negatively affect the sensor, and superimposed vibrations do not interfere with the sensor's accuracy. This may be achieved, e.g., by either ensuring the superimposed vibrations do not affect the measurements during operation or by alternating the superimposed vibrations with the sensor's operational periods.

Accordingly, the amplitude and frequency of the superimposed vibrations of vibrator 106 are controlled to ensure that resonator 102 remains undamaged and operates as expected. For example, vibrator 106 may operate at a frequency significantly lower than the operating frequency of resonator 102, such that the bandwidth of any structural/resonant mode(s) of resonator 102 are avoided and the respective oscillations can be easily decoupled. For example, a wide separation of cleaning and measurement frequencies enables simple signal filtering, e.g., using a high-pass filter to permit transmission of measurement-relevant signals from resonator 102 while attenuating transmission of spurious signals induced by vibrator 106. Additionally, the amplitude and frequency of the superimposed vibrations are controlled to prevent large stresses in the sensor's resonant structures, as these stresses could excite resonant modes, leading to plastic deformations or failure due to fatigue. For example, vibrator 106 may operate in a range of 100-150 Hz, with an amplitude on the order of 0.1 mm to 1 mm.

A further advantage of low frequency vibrations is a lower contribution to fluid shear rate, which is less likely to disrupt the structure of structured fluids, such as gels and suspensions, and therefore more likely to provide more accurate measurements.

Alternatively, in some examples, the vibrations are intentionally configured to disrupt the structure of a fluid. For example, if the fluid under test is one in which resonator 102 is unable to accurately measure fluid properties due to the structure of the fluid, vibrator 106 may be configured to produce vibrations suitable for disrupting the structure, such that resonator 102 is able to conduct stable measurements.

Figure 2:
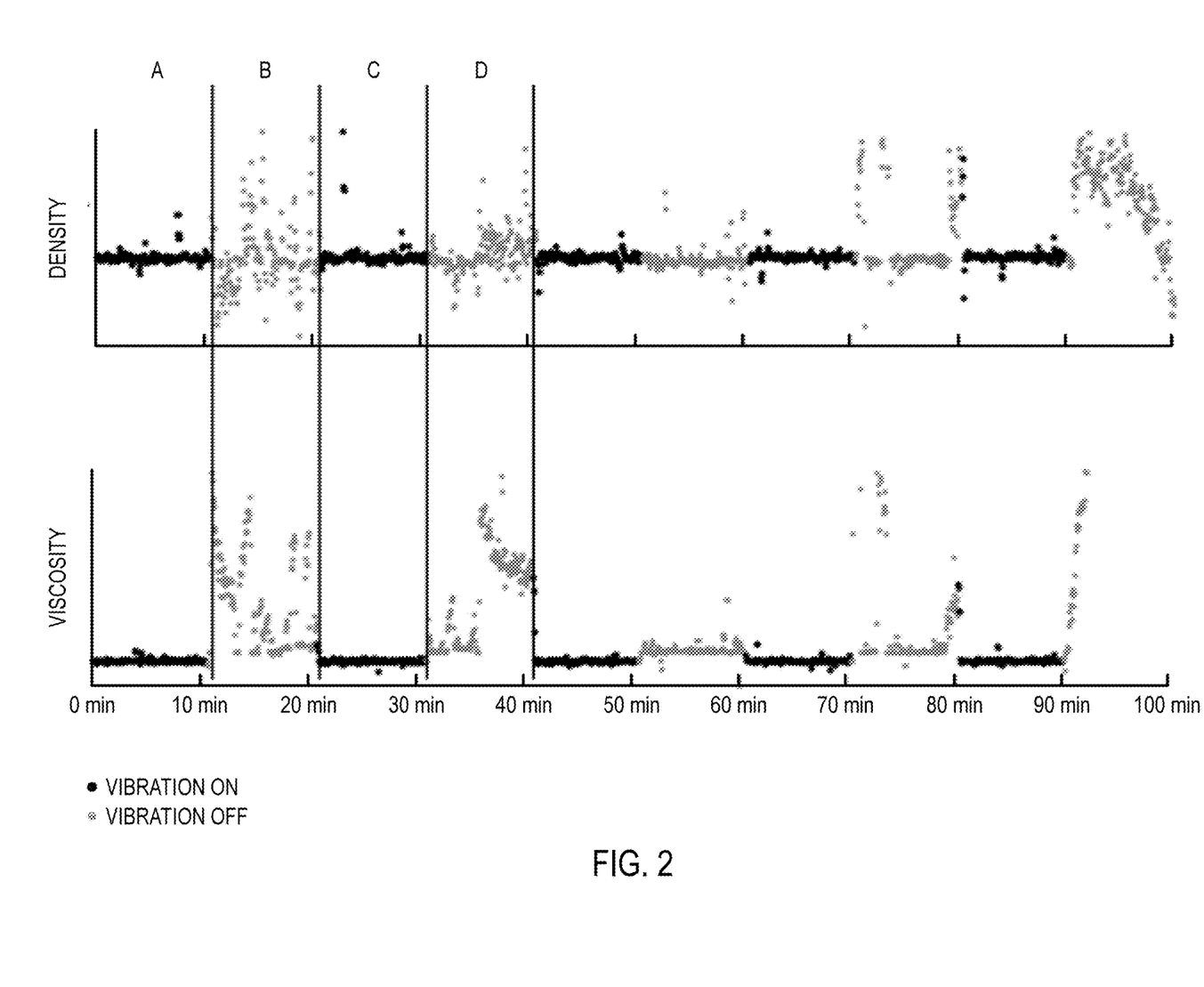
FIG. 2 depicts fluid density and viscosity measurements taken by the sensor of FIG. 1 operating in an intermittent cleaning mode.

In examples in which structural components of sensor 100 act as waveguides, e.g., examples in which resonator 102 operates in the ultrasonic range, the frequency of vibrator 106 is controlled such that the superimposed vibrations are outside the resonance mode(s) of the structural components. In general (i.e., not only in the ultrasonic range), the system may be configured to avoid structural resonances for the vibrator frequency so as to prevent structural damage. Furthermore, the amplitude of the superimposed vibrations may be selected such that material buildup on the resonator is effectively dislodged, but structural damage to resonator 102 (and sensor 100 in general) is avoided. In some examples, vibrator 106 is operated in an intermittent and/or periodic configuration, see FIG. 2. FIG. 2 depicts example measurements taken over time as vibrator 106 is engaged and disengaged (e.g., turned on and off, enabled and disabled, activated and deactivated, and/or coupled and decoupled with respect to chassis 104 or resonator 102). As shown in FIG. 2, vibrator 106 may operate with a selected duty cycle (e.g., 50%), in which portions of the duty cycle correspond to vibrator 106 operating at and/or near full power, such as depicted at A and C, and other portions of the duty cycle correspond to vibrator 106 being off and/or operating with low power, such as depicted at B and D.

Such intermittent and/or periodic operation of vibrator 106 enables discouragement of buildup on resonator 102 during periods of operation and enables unaffected operation of resonator 102 during periods of inactivity. Additionally, as shown in FIG. 2, operation of sensor 100 may be more accurate during periods in which vibrator 106 is engaged, such as when the fluid under test comprises a non-Newtonian fluid, as described in more detail above.

Chassis 102 may be coupled to a mounting structure 108 configured to engage and retain chassis 102, e.g., during operation. Chassis 102 may be releasably or permanently coupled to mounting structure 108. In some examples, mounting structure 108 comprises a mounting plate configured to receive a portion of chassis 102. For example, mounting structure 108 may comprise a plate having an aperture configured to receive and retain chassis 102. In some examples, mounting structure 108 includes one or more fasteners configured to engage and support chassis 102, such as one or more clamps, docking elements, set screws, etc.

Mounting structure 108 may be further coupled to a support structure 112 via one or more resilient members 110. Resilient members 110 may include any suitable element(s) configured to decouple or isolate movement of chassis 104 from support structure 112. This decoupling helps to minimize stress imparted on the support structure from operation of vibrator 106 and permits larger amplitude vibrations to be transmitted from vibrator 106 to resonator 102. As a counterexample, if rigid mounting is used the rigid mounting can restrain the motion of the sensor and diminish efficiency of the cleaning vibration. In some examples, resilient members 110 comprise a polymer or a rubber. For example, resilient members 110 may comprise one or more gaskets, bushings, pads, and/or other polymeric devices suitable for decoupling vibrations from chassis 102 to support structure 112. Additionally, or alternatively, resilient members 110 may comprise one or more springs, shock absorbers, and/or other suitable resilient, elastic, or dampening devices.

Support structure 112 may be used to suspend chassis 104 such that resonator 102 is held in a desired position relative to the fluid, e.g., is submerged within the fluid under test during operation of sensor 100. Support structure 112 may comprise any structure suitable for supporting the weight of sensor 100 and enabling resonator 102 to be submerged into the fluid. For example, support structure 112 may comprise a stand, e.g., a ring stand, a tripod stand, a wall mounted rack, etc. In some examples, support structure 112 may be configured to be coupled to a container used to hold the fluid under test. For example, support structure 112 may be mounted to a rim of a reservoir or tank containing the fluid. Support structure 112 may be manipulable, e.g., including an articulable or pivotable arm.

In some examples, sensor 100 may be a handheld fluid property sensor. In a handheld configuration, sensor 100 may be uncoupled from mounting structure 108 and/or support structure 112. As handheld instruments tend to have unsteady motion, e.g., due to the unsteadiness of the user's hand, the local structure of the fluid under test may be disrupted in an undefined manner. Accordingly, the superimposed vibrations of vibrator 106 helps to create a local flow field with larger flow velocities than those produced by normal unsteadiness of the hand, thereby stabilizing the readings and producing a useful parameter for characterizing the fluid.

In some examples, sensor 100 may be configured to be mounted through a wall of a tank or pipe. Accordingly, one or more portion of chassis 104 may be elastically compliant, such vibrator 106 may cause resonator 102 to vibrate with larger amplitude than in the case of a rigid support. In such examples, sensor 100 may not necessarily utilize compliant mountings 110.

B. Illustrative Fluid Property Sensor with External Vibrator

Figure 3:
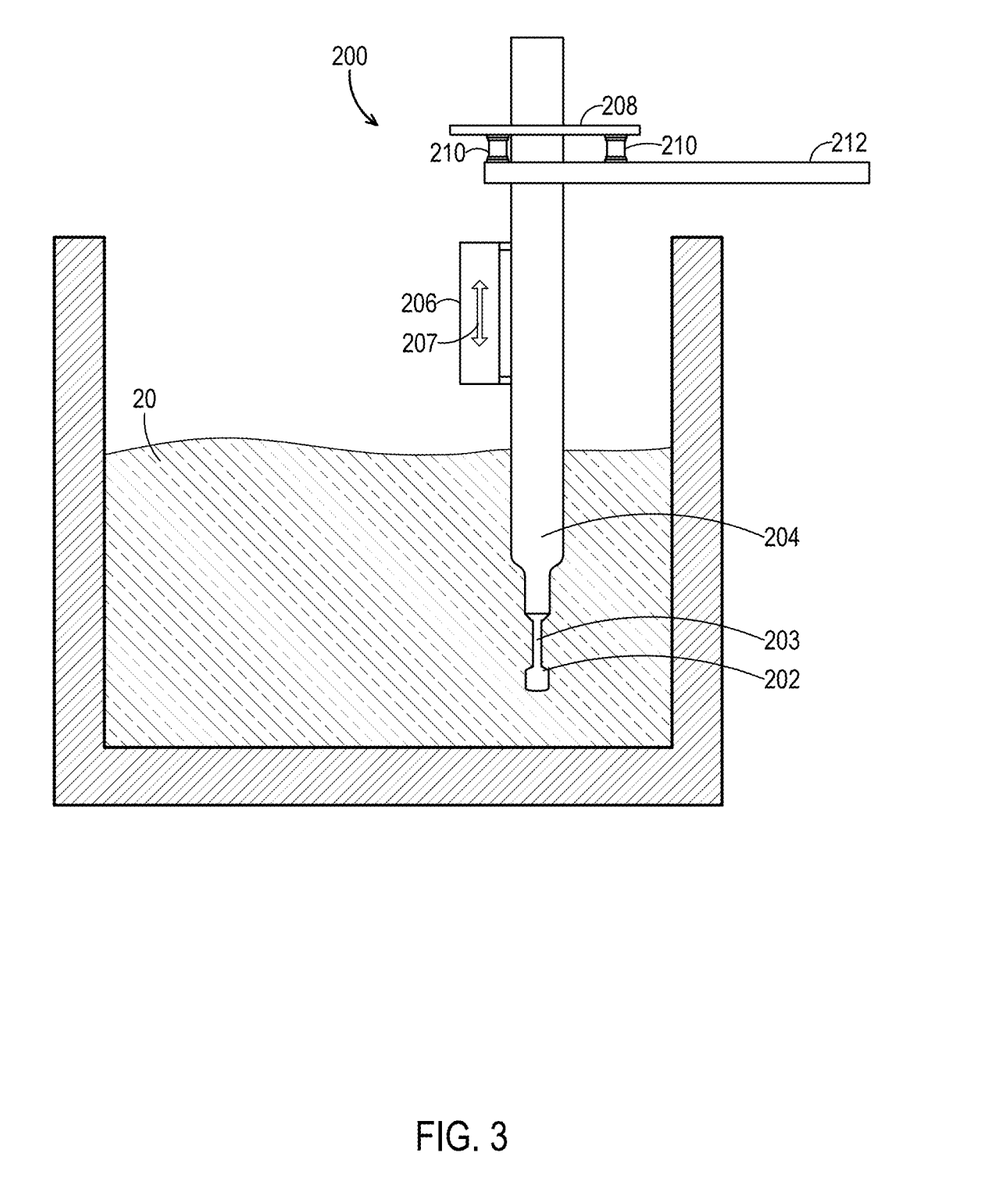
FIG. 3 is a side elevation view of a first illustrative fluid property sensor, which is an example of the sensor of FIG. 1.

As shown in FIG. 3, this section describes an example fluid property sensor 200. Sensor 200 is an example of fluid property sensor 100 described above in which a vibrator is located external to a chassis of the sensor. Accordingly, sensor 200 is substantially similar to sensor 100.

As with sensor 100 described above, sensor 200 includes a resonant fluid property sensor 202 (AKA a resonator) configured to be submerged within a fluid 20 during operation of the sensor. Resonator 202 is coupled, e.g., via a coupling structure 203, to a chassis 204 of sensor 200. In some examples, coupling structure 203 is unitary with resonator 202 and/or the two elements can otherwise collectively be considered the resonator.

Sensor 200 includes a vibrator 206 located external to chassis 204, vibrator 206 comprises a linear oscillator configured to produce superimposed vibrations along axis 207. In the example depicted in FIG. 3, axis 207 is oriented along the long axis of sensor 200 such that the vibrations imparted by vibrator 206 are also along the long axis of sensor 200.

Chassis 202 is coupled to a mounting structure 208 configured to engage and retain chassis 202 during operation. Mounting structure 208 is further coupled to a support structure 212 via one or more resilient members 210. Support structure 212 suspends chassis 204 and resonator 202 in fluid 20 during operation of sensor 200. Resilient members 210 may include any suitable element(s) configured to decouple and/or isolate movement of chassis 204 from support structure 212, thereby minimizing stress imparted on the support structure from operation of vibrator 206.

C. Illustrative Fluid Property Sensor with Internal Vibrator

Figure 4:
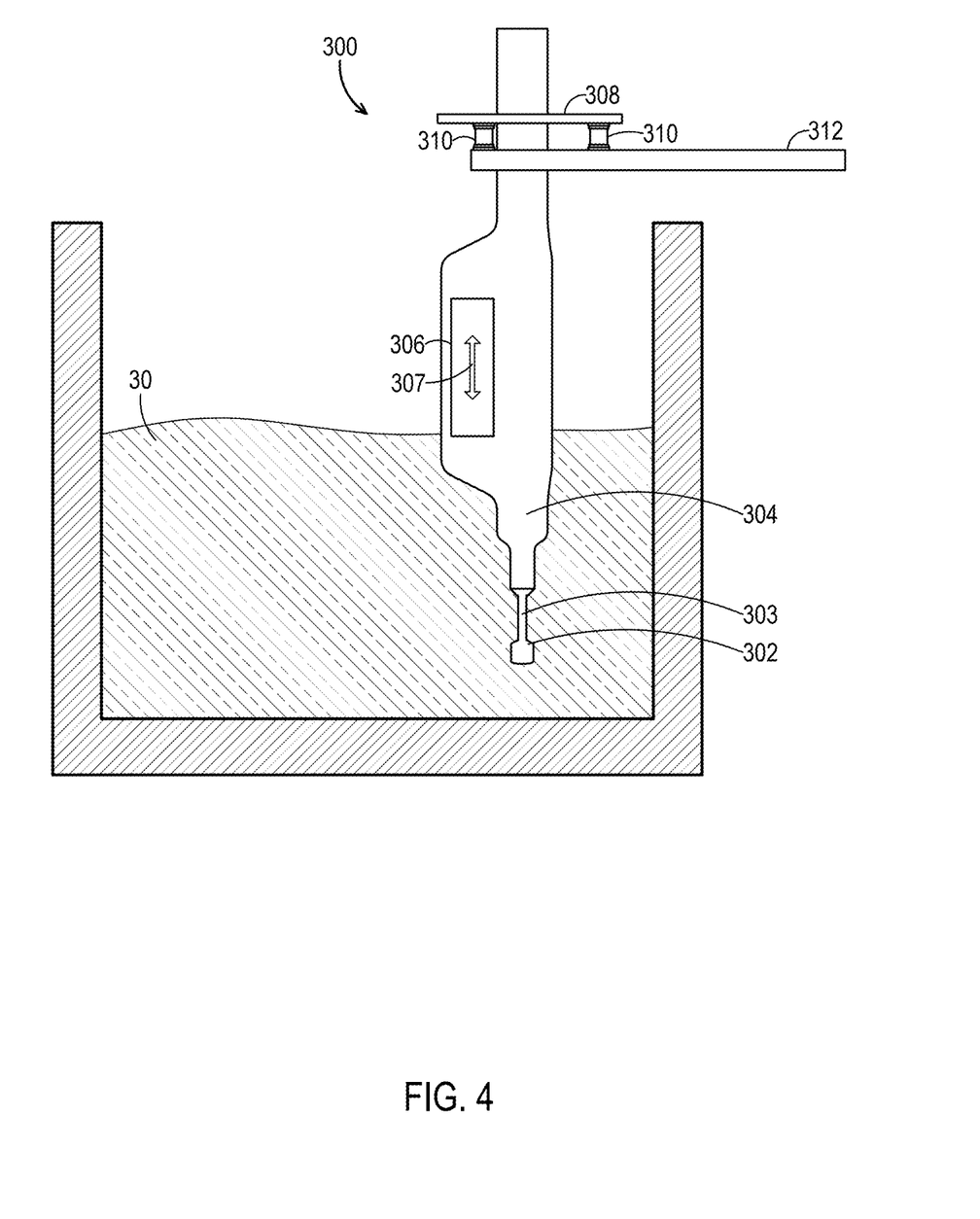
FIG. 4 is a side elevation view of a second illustrative fluid property sensor, which is another example of the sensor of FIG. 1.

As shown in FIG. 4, this section describes an example fluid property sensor 300. Sensor 300 is an example of fluid property sensor 100 described above in which a vibrator is located internal to a chassis of the sensor. Accordingly, sensor 300 is substantially similar to sensor 100.

As with sensor 100 described above, sensor 300 includes a resonant fluid property sensor 302 (AKA a resonator) configured to be submerged within a fluid 30 during operation of the sensor. Resonator 302 is coupled, e.g., via a coupling structure 303, to a chassis 304 of sensor 300. In some examples, coupling structure 303 is unitary with resonator 302 and/or the two elements can otherwise collectively be considered the resonator.

Sensor 300 includes a vibrator 306 located external to chassis 304, vibrator 306 comprises a linear oscillator configured to produce superimposed vibrations along axis 307. In the example depicted in FIG. 4, axis 307 is oriented along the long axis of sensor 300 such that the vibrations imparted by vibrator 306 are also along the long axis of sensor 300.

Chassis 302 is coupled to a mounting structure 308 configured to engage and retain chassis 302 during operation. Mounting structure 308 is further coupled to a support structure 312 via one or more resilient members 310. Support structure 312 is used to suspend chassis 304 and resonator 302 into fluid 30 during operation of sensor 300. Resilient members 310 may include any suitable element(s) configured to decouple movement of chassis 304 from support structure 312, thereby minimizing stress imparted on the support structure from operation of vibrator 306.

D. Illustrative Method

Figure 5:
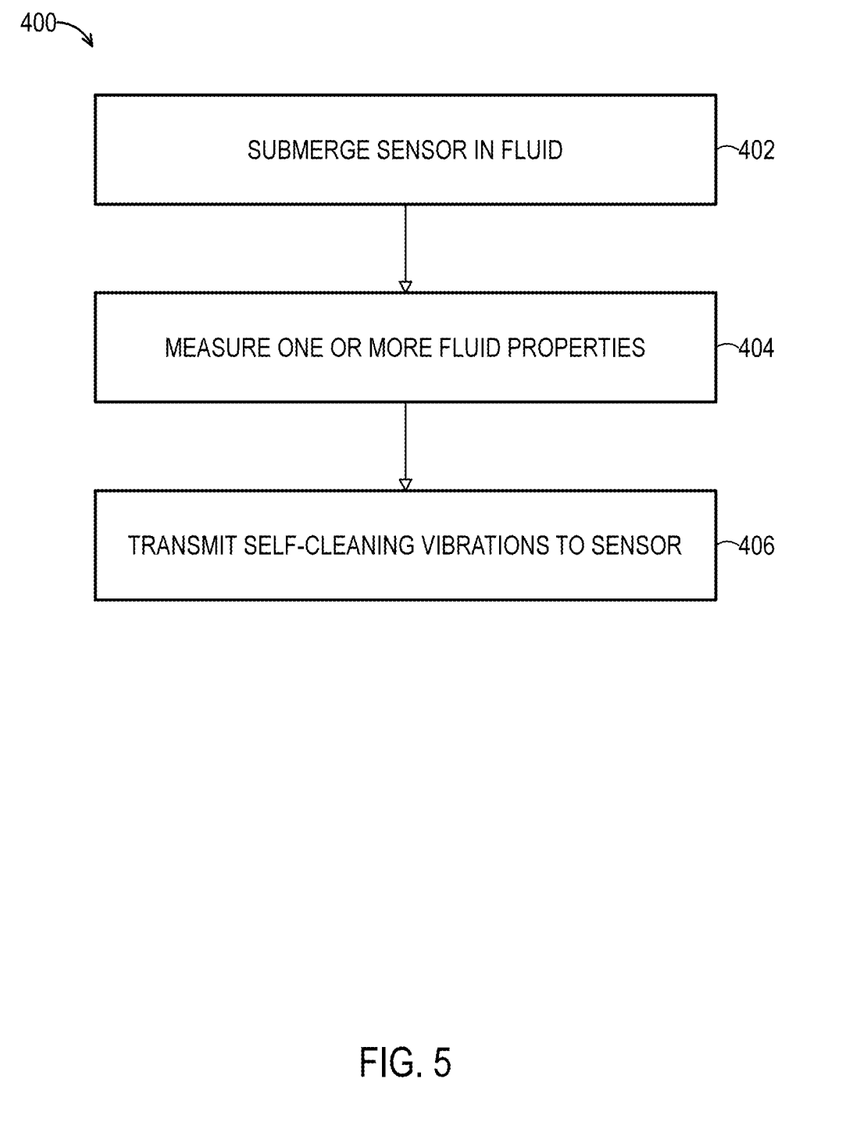
FIG. 5 is a flow chart depicting steps of an illustrative method for measuring properties of a fluid using a sensor in accordance with aspects of the present disclosure.

This section describes steps of an illustrative method 400 for measuring one or more fluid properties using a fluid property sensor (e.g., sensor 100, 200, 300); see FIG. 5. Aspects of systems described above may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 400 are described below and depicted in FIG. 5, the steps need not necessarily all be performed, and in some cases may be performed simultaneously or in a different order than the order shown.

Step 402 of method 400 includes submerging a resonant fluid property sensor (e.g., sensor 100, 200, 300) into a fluid (e.g., investment casting slurry, tomato ketchup, or the like). The resonant fluid property sensor may include any suitable resonator, such as a balanced torsional resonator.

Step 404 of method 400 includes measuring one or more fluid properties of the fluid using the resonant fluid property sensor, wherein the fluid property sensor is configured to operate at a resonant frequency. In some examples, the resonant frequency of the resonant fluid property sensor is greater than or equal to 2,000 Hertz. In some examples, measuring one or more fluid properties of the fluid using the resonant fluid property sensor includes measuring a density, a viscosity, and/or a temperature of the fluid.

Step 406 of method 400 includes transmitting vibrations to the resonant fluid property sensor at a self-cleaning frequency lower than the resonant frequency. In some examples, the self-cleaning frequency is less than 1,000 Hertz and/or the vibrations at the self-cleaning frequency have an amplitude greater than 100 micrometers. Vibrations may be produced by a vibrator (e.g., a linear vibrator), such as vibrators 106, 206, 306. In some examples, step 406 includes dislodging and/or preventing material buildup on the resonant fluid property sensor using the vibrations.

In some examples, the vibrations at the self-cleaning frequency are transmitted intermittently, and may have a selected duty cycle.

E. Illustrative Combinations and Additional Examples

This section describes additional aspects and features of fluid property sensors, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for measuring properties of fluids using a resonant sensor probe, and for cleaning the sensor of adherent deposits without interrupting its operation, the method comprising providing:
  a. a resonant fluid property sensor having a measurement vibration frequency and amplitude suitable for measuring the properties of the fluid, whereby the measurement vibration frequency is from 2000 Hz to 10,000 Hz (or more).
  b. a vibration mechanism configured to superimpose a vibration on the resonant sensor.

A1. The method of A0, wherein fluid properties to be measured include viscosity and/or density.

A2. The method of A0 or A1, further comprising measuring fluid properties using a balanced resonant sensor.

A3. The method of A2, wherein measurement is made using a torsional mode of the balanced resonant sensor.

A4. The method of any one of A0 through A3, wherein superimposed vibration has a lower frequency and a higher amplitude than the vibration of the resonant sensing element during its measurement process, whereby the amplitude is substantially in excess of the measurement vibration amplitude, and the low frequency vibration is substantially lower in frequency than the lowest vibrational mode of the resonant sensor means, and whereby the superimposed high-amplitude, low-frequency superimposed vibration is of sufficient amplitude to keep the resonant sensor substantially free of deposited material during its operation.

A5. The method of any one of A0 through A4, further comprising vibrating the measurement mechanism either pneumatically or electrically.

A6. The method of A5, wherein the vibration direction may be either parallel to, transverse to, or torsionally coaxial with long axis of the resonant sensor.

A7. The method of any one of A0 through A6, wherein frequency of superimposed vibration is selected so as to be substantially below the resonance frequency of the sensor to avoid damage to the resonant sensor by, for instance, metal fatigue due to excessive repetitive application of large displacements.

B0. A self-cleaning sensing device for measuring one or more properties of a fluid in which it is immersed, whereby the fluid may be prone to deposition of adherent material on surfaces which are immersed in it, and whereby the self-cleaning device comprises:
  a. a resonant fluid property sensor having a resonance frequency greater than or equal to 2,000 Hz;

b. a mounting configured to immerse the resonator in the fluid; and
c. a vibrator in immediate contact with the sensor such as to transmit a large-amplitude, low-frequency vibration to the resonant fluid property sensor.

B1. The device of B0, wherein the sensor measures one or more of, but not restricted to, the properties density, viscosity, and temperature.

B2. The device of B0 or B1, wherein the resonant fluid property sensor is a balanced resonator.

B3. The device of any one of B0 through B2, wherein the sensor is a torsional resonator, e.g.:
  i. having a first transverse bending mode whose frequency is not less than 1000 Hz.
  ii. having a first torsional mode whose frequency is not less than 2000 Hz.
  iii. having a surface displacement of not greater than 10 micrometers B4. The device of any one of B0 through B3, wherein the vibrator has a frequency of operation less than 1000 Hz.

B5. The device of any one of B0 through B4, wherein the vibrator has a displacement amplitude of greater than 100 micrometers B6. The device of any one of B0 through B5, wherein the vibrator is one of:
  a. pneumatically actuated vibrator whose vibration direction is parallel to the long axis of the resonant sensor
  b. pneumatic vibrator vibrating transversely to long axis of resonator
  c. vibrating torsionally around long axis of resonator
  d. electrically actuated parallel
  e. electrically actuated transverse
  f. electrically actuated torsional B7. The device of B6, wherein all electrically actuated vibrators may be one of multiple designs, including motors with eccentric masses affixed to their rotors, solenoid-actuated vibrators, and other electromagnetically actuated vibrators.

C0. A device (e.g., a self-cleaning device) for measuring one or more properties of a fluid or flowable medium, the device comprising:
  a resonant fluid property sensor coupled to a sensor chassis, wherein the resonant fluid property sensor is configured to operate at a first frequency;
  a support structure coupled to the sensor chassis, wherein the support structure is configured to support the sensor chassis when the resonant fluid property sensor is immersed in a fluid; and
  a vibrator coupled to the sensor chassis, wherein the vibrator is configured to vibrate at a second frequency and transmit the vibrations through the chassis to the resonant fluid property sensor.

C1. The device of paragraph C0, wherein the first frequency of the resonant fluid property sensor is greater than or equal to 2,000 Hertz.

C2. The device of paragraph C1, wherein the first frequency of the resonant fluid property sensor is between 4,000 Hertz and 10,000 Hertz.

C3. The device of any of paragraphs C0-C2, wherein the second frequency of the vibrator is less than 1,000 Hertz.

C4. The device of paragraph C3, wherein the second frequency of the vibrator is between 100 Hertz and 150 Hertz.

C5. The device of any of paragraphs C0-C4, wherein the vibrator is configured to vibrate with an amplitude greater than 100 micrometers.

C6. The device of paragraph C5, wherein the amplitude is 0.1 millimeters to 1 millimeter.

C7. The device of any of paragraphs C0-C6, wherein the vibrator is disposed external to the sensor chassis.

C8. The device of any of paragraphs C0-C7, wherein the vibrator is disposed internal to the sensor chassis.

C9. The device of any of paragraphs C0-C8, wherein the resonant fluid property sensor is configured to measure a density, a viscosity, and/or a temperature of the fluid.

C10. The device of any of paragraphs C0-C9, wherein the resonant fluid property sensor comprises a balanced torsional resonator.

C11. The device of paragraph C10, wherein the resonant fluid property sensor has a first torsional mode frequency greater than or equal to 2,000 Hz.

C12. The device of paragraph C11, wherein the resonant fluid property sensor is configured to have a surface displacement of less than 10 micrometers.

C13. The device of any of paragraphs C0-C12, wherein the vibrator is a pneumatically actuated vibrator.

C14. The device of any of paragraphs C0-C13, wherein the vibrator is an electrically actuated vibrator.

C15. The device of any of paragraphs C0-C14, wherein the vibrator is a linear vibrator.

C16. The device of any of paragraphs C0-C15, wherein the vibrator is a torsional vibrator.

C17. The device of any of paragraphs C0-C16, wherein the chassis is coupled to the support structure by one or more resilient members.

C18. The device of any of paragraphs C0-C17, wherein the vibrator is configured to operate intermittently.

C19. The device of paragraph C18, wherein the vibrator is configured to operate with a selected duty cycle.

D0. A method of measuring one or more fluid properties using a device (e.g., a self-cleaning device), the method comprising:
  submerging a resonant fluid property sensor into a fluid or flowable medium;
  measuring one or more fluid properties of the fluid with the resonant fluid property sensor, wherein the fluid property sensor is configured to operate at a first frequency; and
  operating a vibrator at a second frequency, such that vibrations of the vibrator are transmitted to the resonant fluid property sensor.

D1. The method of paragraph D0, further comprising:
  dislodging material buildup on the resonant fluid property sensor with the vibrations.

D2. The method of paragraph D0 and/or D1, wherein the first frequency of the resonant fluid property sensor is greater than or equal to 2,000 Hertz.

D3. The method of any of paragraphs D0-D2, wherein the second frequency of the vibrator is less than 1,000 Hertz.

D4. The method of any of paragraphs D0-D3, wherein the vibrations of the vibrator have an amplitude greater than 100 micrometers.

D5. The method of any of paragraphs D0-D4, wherein measuring one or more fluid properties of the fluid with the resonant fluid property sensor includes measuring a density, a viscosity, and/or a temperature of the fluid.

D6. The method of any of paragraphs D0-D5, wherein the resonant fluid property sensor comprises a balanced torsional resonator.

D7. The method of any of paragraphs D0-D6, wherein the vibrator is a linear vibrator.

D8. The method of any of paragraphs D0-D7, wherein operating the vibrator at the second frequency comprises operating the vibrator intermittently.

D9. The method of paragraph D8, wherein operating the vibrator intermittently comprises operating the vibrator with a selected duty cycle.

E0. A method of measuring one or more fluid properties, the method comprising:
- submerging a resonant fluid property sensor into a fluid or flowable medium;
- measuring one or more fluid properties of the fluid or flowable medium using the resonant fluid property sensor, wherein the fluid property sensor is configured to operate at a resonant frequency; and
- transmitting vibrations to the resonant fluid property sensor at a second frequency lower than the resonant frequency.

E1. The method of E0, further comprising:
- dislodging material buildup on the resonant fluid property sensor using the transmitted vibrations.

E2. The method of E0 or E1, wherein the resonant frequency of the resonant fluid property sensor is greater than or equal to 2,000 Hertz.

E3. The method of any one of E0 through E2, wherein the second frequency is less than 1,000 Hertz.

E4. The method of any one of E0 through E3, wherein the vibrations at the second frequency have an amplitude greater than 100 micrometers.

E5. The method of any one of E0 through E4, wherein measuring one or more fluid properties of the fluid using the resonant fluid property sensor includes measuring a density, a viscosity, and/or a temperature of the fluid.

E6. The method of any one of E0 through E5, wherein the resonant fluid property sensor comprises a balanced torsional resonator.

E7. The method of any one of E0 through E6, wherein the vibrations at the second frequency are generated by a linear vibrator.

E8. The method of any one of E0 through E7, wherein the vibrations at the second frequency are transmitted intermittently.

E9. The method of E8, wherein the vibrations are transmitted at a selected duty cycle.

Advantages, Features, and Benefits

The different embodiments and examples of the sensors described herein provide several advantages over known solutions for measuring fluid properties. For example, illustrative embodiments and examples described herein allow for reliable, repeatable, and stable online measurements of process-relevant fluid behavior in the presence of highly non-Newtonian behavior under variable flow regimes, as well as in fluids that tend to produce deposits on the sensors.

Additionally, and among other benefits, illustrative embodiments and examples described herein allow a self-cleaning mechanism that prevents buildup on the sensor, thereby preserving its resonance characteristics and maintaining calibration without the need for recalibration after exposure to fluids.

Additionally, and among other benefits, illustrative embodiments and examples described herein ensure that superimposed vibrations do not interfere with the sensor's primary role of providing accurate and reproducible fluid measurements by controlling the amplitude and frequency of the superimposed vibrations to prevent large stresses in the sensor's resonant structures and to avoid saturating or distorting the signal from the resonator.

Additionally, and among other benefits, illustrative embodiments and examples described herein allow for quick recovery of the sensor following the cleaning phase, enabling accurate measurements before further deposition occurs.

Additionally, and among other benefits, as known methods for measuring the properties of a fluid moving past a sensor are susceptible to variation due to the flow velocity of the fluid, illustrative embodiment and examples described herein reduce a fluid property measurement's dependence on an external flow field by producing a strong and repeatable local flow field whose influence supersedes that of the bulk fluid flow velocity.

Additionally, and among other benefits, uniform local flow field imposed by the superimposed vibration may produce a stable and repeatable shift in sensor readings that the sensor would provide for the same fluid in the absence of a superimposed flow field, even for many strongly non-Newtonian fluids. The influence by the superimposed vibration can be used as an auxiliary data point which, in addition to the single-point measurement produced by the sensor without superimposed vibration, provide an additional parameter for characterizing the fluid under test. By varying the amplitude and frequency of the superimposed vibration it is possible to vary the velocity field around the resonator, thereby enabling the measurement of multiple measurements in varying, controlled flow fields and thus enabling construction of a rheological flow curve.

Additionally, and among other benefits, e.g., in the case that the sensor accumulates a deposit in the absence of the superimposed vibration, the drift of the sensor's readings may be used to understand the degree of deposition, for example, through a detected shift in the sensor's resonance frequency, which correlates with the quantity of deposited material. The shift of the sensor's frequency and damping in response to the addition of superimposed vibration can be used to quantify the quantity and/or characteristics of the deposits.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A device for measuring one or more properties of a flowable medium, the device comprising:
   a resonant fluid property sensor coupled to a sensor chassis, wherein the resonant fluid property sensor comprises a balanced torsional resonator configured to vibrate symmetrically around a nodal point at a first frequency;
   a support structure coupled to the sensor chassis, wherein the support structure is configured to support the sensor chassis when the resonant fluid property sensor is immersed in a flowable medium; and
   a vibrator coupled to the sensor chassis, wherein the vibrator is configured to vibrate at a second frequency and transmit vibrations through the chassis to the resonant fluid property sensor.

2. The device of claim 1, wherein the first frequency of the resonant fluid property sensor is greater than or equal to 2,000 Hertz.

3. The device of claim 1, wherein the second frequency of the vibrator is less than 1,000 Hertz.

4. The device of claim 1, wherein the vibrator is configured to vibrate with an amplitude greater than 100 micrometers.

5. The device of claim 1, wherein the vibrator is disposed external to the chassis.

6. The device of claim 1, wherein the resonant fluid property sensor is configured to measure a density, a viscosity, and/or a temperature of the flowable medium.

7. The device of claim 1, wherein the vibrator is a linear vibrator.

8. The device of claim 1, wherein the chassis is coupled to the support structure by one or more resilient members.

9. The device of claim 1, wherein the vibrator is configured to operate intermittently.

10. The device of claim 1, wherein the resonant fluid property sensor is coupled to the sensor chassis at the nodal point.

11. A method of measuring one or more fluid properties, the method comprising:
   submerging a resonant fluid property sensor comprising a balanced torsional resonator into a flowable medium;
   measuring one or more fluid properties of the flowable medium using the resonant fluid property sensor, wherein the fluid property sensor is configured to vibrate symmetrically around a nodal point at a resonant frequency; and
   transmitting vibrations through a sensor chassis to the resonant fluid property sensor at a second frequency lower than the resonant frequency.

12. The method of claim 11, further comprising:
   dislodging material buildup on the resonant fluid property sensor using the transmitted vibrations.

13. The method of claim 11, wherein the resonant frequency of the resonant fluid property sensor is greater than or equal to 2,000 Hertz.

14. The method of claim 11, wherein the second frequency is less than 1,000 Hertz.

15. The method of claim 11, wherein the vibrations at the second frequency have an amplitude greater than 100 micrometers.

16. The method of claim 11, wherein measuring one or more fluid properties of the flowable medium using the resonant fluid property sensor includes measuring a density, a viscosity, and/or a temperature of the flowable medium.

17. The method of claim 11, wherein the vibrations at the second frequency are generated by a linear vibrator.

18. The method of claim 11, wherein the vibrations at the second frequency are transmitted intermittently.

19. The method of claim 18, wherein the vibrations are transmitted at a selected duty cycle.

20. The method of claim 11, wherein the resonant fluid property sensor is coupled to the sensor chassis at the nodal point.

* * * * *